US 8,485,087 B2

(12) United States Patent
Ostini

(10) Patent No.: US 8,485,087 B2
(45) Date of Patent: Jul. 16, 2013

(54) FLUID DISTRIBUTOR APPARATUS AND PUNCHING METHOD

(75) Inventor: Giorgio Ostini, Grono (CH)

(73) Assignee: Euromac S.p.A., Formigine (MO) (IT)

( * ) Notice: Subject to any disclaimer, the term of this patent is extended or adjusted under 35 U.S.C. 154(b) by 975 days.

(21) Appl. No.: 12/531,080

(22) PCT Filed: Feb. 25, 2008

(86) PCT No.: PCT/IB2008/000403
§ 371 (c)(1),
(2), (4) Date: Sep. 14, 2009

(87) PCT Pub. No.: WO2008/110882
PCT Pub. Date: Sep. 18, 2008

(65) Prior Publication Data
US 2010/0095817 A1  Apr. 22, 2010

(30) Foreign Application Priority Data
Mar. 15, 2007 (GB) .................................. 0705015.6

(51) Int. Cl.
*F15B 13/16* (2006.01)

(52) U.S. Cl.
USPC ............ 91/364; 91/388; 83/617; 100/269.14; 100/269.16

(58) Field of Classification Search
USPC .................... 72/453.01, 453.03; 91/364, 368, 91/388; 83/617, 639.1, 821, 684, 686; 100/269.01, 271, 269.14, 269.15, 269.16
See application file for complete search history.

(56) References Cited

U.S. PATENT DOCUMENTS

| 2,512,731 | A | * | 6/1950 | Adams ........................... 100/353 |
| 4,718,842 | A | * | 1/1988 | Labbe et al. ................... 425/149 |
| 4,825,745 | A | * | 5/1989 | Kuttruf .............................. 91/24 |
| 5,135,030 | A | * | 8/1992 | Schoen ..................... 137/625.63 |
| 5,379,628 | A | * | 1/1995 | Pahnke et al. ............. 72/453.18 |
| 6,550,241 | B2 | | 4/2003 | Ostini |

FOREIGN PATENT DOCUMENTS

| EP | 1308635 | | 5/2003 |
| JP | 60018297 | * | 1/1985 |

OTHER PUBLICATIONS

JP-60018297 Abstract translation in English.*
International Search Report of PCT/IB2008/000403, Jun. 28, 2008.

* cited by examiner

*Primary Examiner* — Edward Look
*Assistant Examiner* — Michael Quandt
(74) *Attorney, Agent, or Firm* — Themis Law

(57) ABSTRACT

A fluid distributor apparatus includes a body having distribution ports; a spool adapted for controlling the distribution ports and mounted slidingly in a first sliding seat obtained in the body and communicating with the distribution ports; a copying-member mounted slidingly and sealed in a second seat obtained in the spool; and a supply system for a controlled supply of the fluid to the second seat, so that the copying-member slides in a controlled way. The supply system includes also a chamber containing the fluid and communicating with said the seat, and a pushing device of the fluid mounted slidingly and sealed in the chamber.

15 Claims, 5 Drawing Sheets

FLUID DISTRIBUTOR APPARATUS AND PUNCHING METHOD

TECHNICAL FIELD

The invention relates to an apparatus for punching machines.

TECHNOLOGICAL BACKGROUND

Punching machines are well-known and are used to punch sheets or sections of variable thickness.

Punching machines are equipped with a hydraulic cylinder that is housed in a seat obtained in a frame and that moves up and down in alternation. The cylinder is adapted for pushing and individually driving a punch that is contained in a punch holding apparatus, which is installed in the frame under the cylinder; the cylinder is provided with a sufficient force to be able to push and carry out the punching even when the sheet is thick.

This force normally remains steady in the punching machines and when the sheets to be punched are of a reduced thickness, this force can be excessive and can produce an over-stroke of the punch through the punched sheet, i.e. a bigger stroke than is strictly necessary to complete the punching and that extends beyond the punched sheet.

This over-stroke causes the penetration of the punch through the sheet to be punched, and into the die that is placed under the sheet on the working surface of the punching machines, in vertical matching with the punch.

This drawback occurs above all when the punching machine carries out a number of very quick and close strokes, so as, for instance, to carry out a so-called "nibbling" operation.

Excessive and undesired penetration by the punch into the die is to be avoided since it can damage both the die and the punch bit: in this case, both of them need to be replaced, so that the punching machine can proceed with its work cycle.

To avoid this over-stroke, punching machine manufactures have used a few solutions. A first solution provides for the cylinder that pushes the punch to be driven in the direction of punching and return by an eccentric body.

This eccentric body turns around a rotation axis, which is perpendicular to the cylinder and defines a surface of direct contact with the latter, which has a cam-shaped profile. On this cam-shaped profile the upper end of the cylinder rests constantly so that the cylinder, by means of the rotation of the eccentric body, is pushed alternately towards the sheet to be punched and then is withdrawn from it in the opposite direction.

The eccentric body is driven in rotation by a couple of electric motors, of the type known as "brushless", each one making the eccentric body perform an arc of rotation: pratically, one motor makes the eccentric body rotate in a first direction while the other motor makes it rotate in the opposite direction, so as to carry out the alternate punching and return strokes.

Alternatively, in place of the two "brushless" motors, two so-called "vector" motors can be used, with the same methods of operation to obtain the downward and upward strokes of the punching cylinder.

This first known solution does have several drawbacks.

A first drawback is that the punching action is obtained by means of parts which are connected to each other only mechanically and, for this reason, high power electric motors are required, with enough power to move the cylinder and then the punch towards a starting position of the punching stroke, to succeed in making it penetrate the sheets to be punched and even to overcome the friction between the elements that are in contact with each other so as to carry out the punching.

Another drawback is that the maximum punching force is obtained while the eccentric body rotates, only when the cylinder head slides along a predetermined and very short section of the profile of the cam contact surface. This section is defined by a much reduced arc of rotation of the eccentric body.

This feature significantly limits the range of use of the punching machine because the maximum penetration force is only available for this short section of the cam profile. A further drawback is that the high power electric motors have a proportionally high cost and inertia.

Due to inertia, the drives are substantially slow; as a consequence, the punching speeds are low and this proportionally reduces the output of the punching machines equipped with this solution.

In a second solution, of a hydro-mechanical type, according to patent EP 1.138.958, an eccentric body has been arranged between the spool of a hydraulic distributor that drives the punching machine's cylinder and an added body integral with the cylinder itself. The eccentric body is made to rotate alternately in one direction and in the other and the spool of the hydraulic distributor, by alternately controlling the opening and closing of the connection ports between the chamber in which the cylinder slides and a source of pressurized oil, practically a pumping unit, initially positions the cylinder at a starting level of the punching stroke, which is determined by the thickness of the sheet to be punched and is placed grazing this, while the eccentric body, once operated, transmits to the cylinder, through the added body integral with it, an alternate and quick motion that allows the latter to carry out punches in very close proximity to each other, as, e.g., is required in the previously mentioned "writing" or "nibbling".

This second solution also has some drawbacks.

A first drawback is that the eccentric body is fixed onto the added body which is integral with the cylinder and, for this reason, the motor unit that makes it rotate must be mounted separately from this added body, so as not to endure the movements and repeated blows to which the cylinder is subject and that would damage it.

At the same time, the motor unit needs to be connected to the eccentric body by means of flexible parts such as, e.g., a Bowden cable, so as to transmit the rotary motion to it.

These flexible parts, with the passing of time and due to the stresses to which they are subjected, tend to become damaged and need to be frequently replaced.

Moreover, they are bulky and obstruct the operators' movements.

Another drawback is that the reversals of rotary motion to which the eccentric body is subjected are substantially slow due to its inertia and this slowness also transmits to the cylinder, both in the punching stroke and in the return one: also in this case, therefore, the total yield of the punching machine is reduced.

OBJECTS OF THE INVENTION

An object of the invention is to improve the state of the art.

A further object of the invention is to provide an apparatus for punching machines which avoids the over-strokes of the punches beyond the sheets to be punched.

Another object of the invention is to provide an apparatus for punching machines that does not damage the dies that work with the punches.

Another object of the invention is to provide an apparatus for punching machines that allows for punching to be carried out in rapid successions not greatly affected by the inertia of the punching machines' parts.

A further object of the invention is to provide an apparatus for punching machines that does not require the interposition of mechanical operating devices between the cylinder and the spool of the distributor.

According to an aspect of the invention, a fluid distributor apparatus is provided, comprising a body having distribution ports; a spool adapted for controlling said distribution ports and mounted sliding in a first seat obtained in said body and communicating with said distribution ports; a copying-member mounted sliding and sealed in a second seat obtained in said spool; supply means for a controlled supplying of said fluid to said second seat so that said copying-member slides in a controlled way, wherein said supply means comprise: chamber means containing said fluid and communicating with said second seat; pushing means of said fluid mounted sliding and sealed in said chamber means.

According to another aspect of the invention a punching method is provided comprising the steps of: activating the movements of a punching cylinder with distributor means of pressurized fluid equipped with copying means mounted sliding seat means obtained in said distributor means; controlling said movements with control means, wherein said activating comprises sending volumes of said pressurized fluid to said seat means thus causing relative movements of said copying means with respect to said distributor means.

The fluid distributor apparatus therefore allows to obtain a controlled supply of fluid towards user apparatuses, such as, e.g. the punching cylinder of punching machines, in this case, to punch any thickness of sheets with a punching force which is steady along the whole punching stroke and adequate so as to avoid undesired over-strokes of the punches.

The fluid distributor apparatus also allows to distribute a fluid towards user apparatuses in such a way that the latter can be operated also in an alternate repetitive and very quick mode, e.g., in the case of punching machines, to carry out the so called "nibbling and writing" on pieces to be punched, without it being necessary to have two motors to carry out the punching and return strokes of the cylinder that operates the punches.

The fluid distributor apparatus is also significantly cheaper than other known apparatuses.

The punching method allows to carry out quick punching and to have punching forces suitable for punching pieces with high mechanical resistance and also proportioned with the thickness of pieces to be punched.

BRIEF DESCRIPTION OF THE DRAWINGS

Further characteristics and advantages will appear more evident from the detailed description of an embodiment of a fluid distributor apparatus, illustrated indicatively by way of non limiting examples, in the attached drawings wherein:

FIG. 6 is a schematic view from the top of the driving means of fluid pushing means in a resting position;

FIG. 7 is a schematic view from the top of the driving means of fluid pushing means in an actuated position.

EMBODIMENTS OF THE INVENTION

Figure 1:
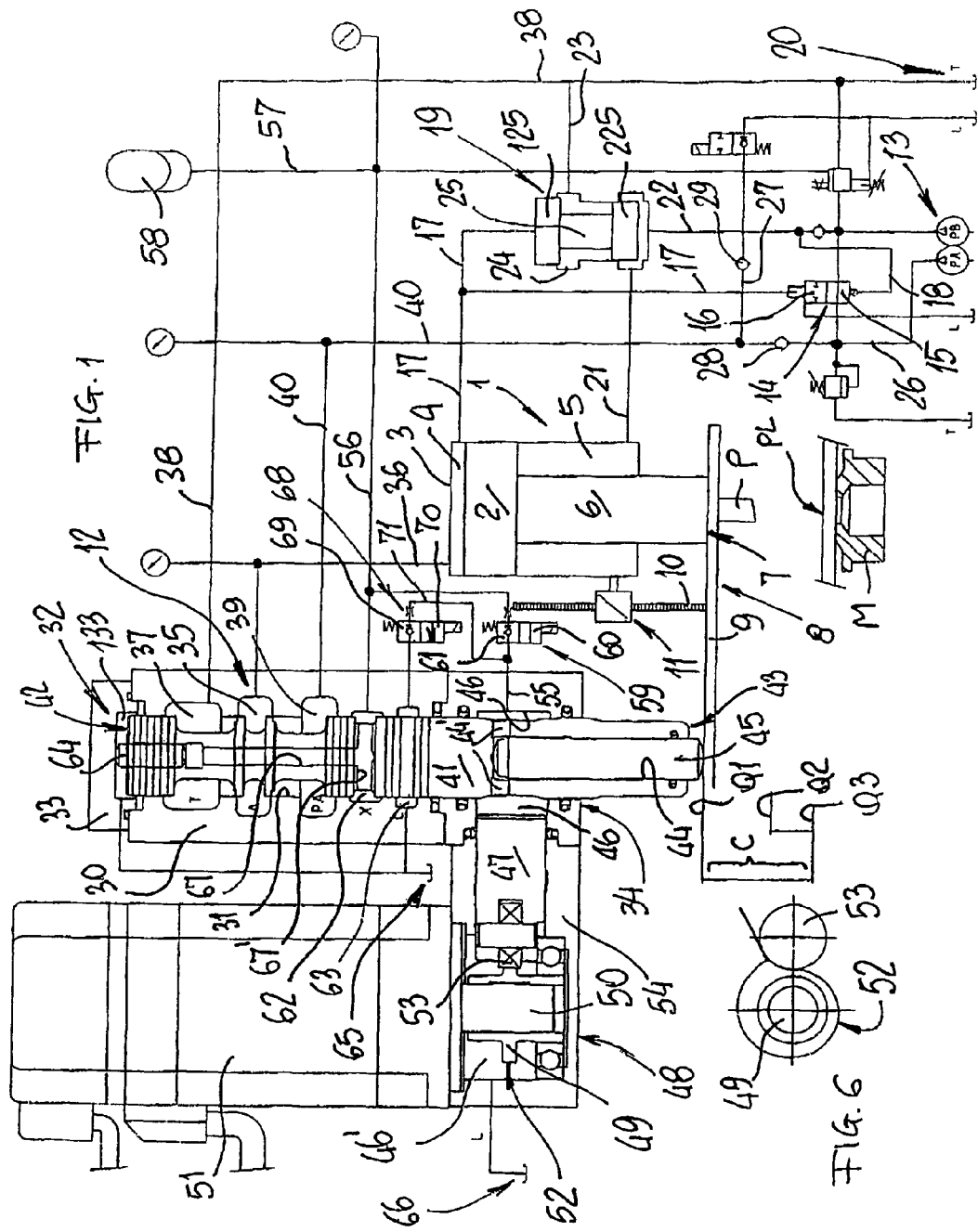
FIG. 1 is a schematic view of an hydraulic circuit for the operation of a cylinder of a punching machine, equipped with a fluid distributor apparatus according to the invention, in a first configuration adapted for the replacement of punches.

With particular reference to the Figures, the term "branches" is meant to indicate the sections of piping in which pressurized oil flows.

In detail, 1 indicates a punching cylinder of a punching machine, which drives the punch "P" and comprises a piston 2 that slides sealed in an outer liner 3 which defines a sliding chamber which is subdivided into two semi-chambers by the piston 2 and are indicated with 4 and 5 respectively; for ease of description and by way of example, the semi-chamber 4 will be considered as upper semi-chamber while the semi-chamber 5 as lower semi-chamber.

As it can be seen in the Figures, in the lower semi-chamber 5 slides the stem 6 of the piston 2, which extends towards the outside, in this specific case downwards, with an end 7 to which a reference body 8 is fastened, precisely a bar arranged perpendicular to the stem 6 of the piston 2.

Onto the bar 9 is fixed a rod element 10 which is part of a detecting unit 11, suitable for detecting, or for actively controlling the movements of the piston 2 with respect to the liner 3.

The expression "actively controlling" means that, if necessary, the detecting unit 11 can stop the strokes of the piston 2 at predetermined levels which can be set as necessary.

The cylinder 1 is connected with a distributor apparatus 12 and with supply means 13 of pressurized fluid, in this specific case, oil.

The connections are made with connecting pipes that will be described in more detail further on.

As it can be seen from the Figures, the supply means 13 comprise two pumps indicated with "PA" and "PB" respectively and which supply oil at high pressure and at low pressure respectively.

The two pumps "PA" and "PB" are placed in parallel to each other and can be activated both jointly to supply oil at low pressure, and separately, when, e.g., the force required to the cylinder 1 to punch a thick piece becomes high and exceeds a predetermined value, which can be set in a hydraulic control logic that regulates the operation of a punching machine. In this case, the single pump PA is used which supplies, as described further on, the semi-chamber 5 with oil at high pressure.

Between the pumps "PA" and "PB" is placed a first valve 14, which has two operating positions, i.e. a connecting position 15 between the pumps and a disconnecting position 16 of these.

The first valve 14 changes over the connecting positions 15 and disconnecting positions 16 by means of the difference in oil pressure which acts on the opposite ends of a spool distributor and which are connected with the upper semi-chamber 4 and with the lower semi-chamber 5 respectively by means of respective branches 17 and 18.

Figure 2:
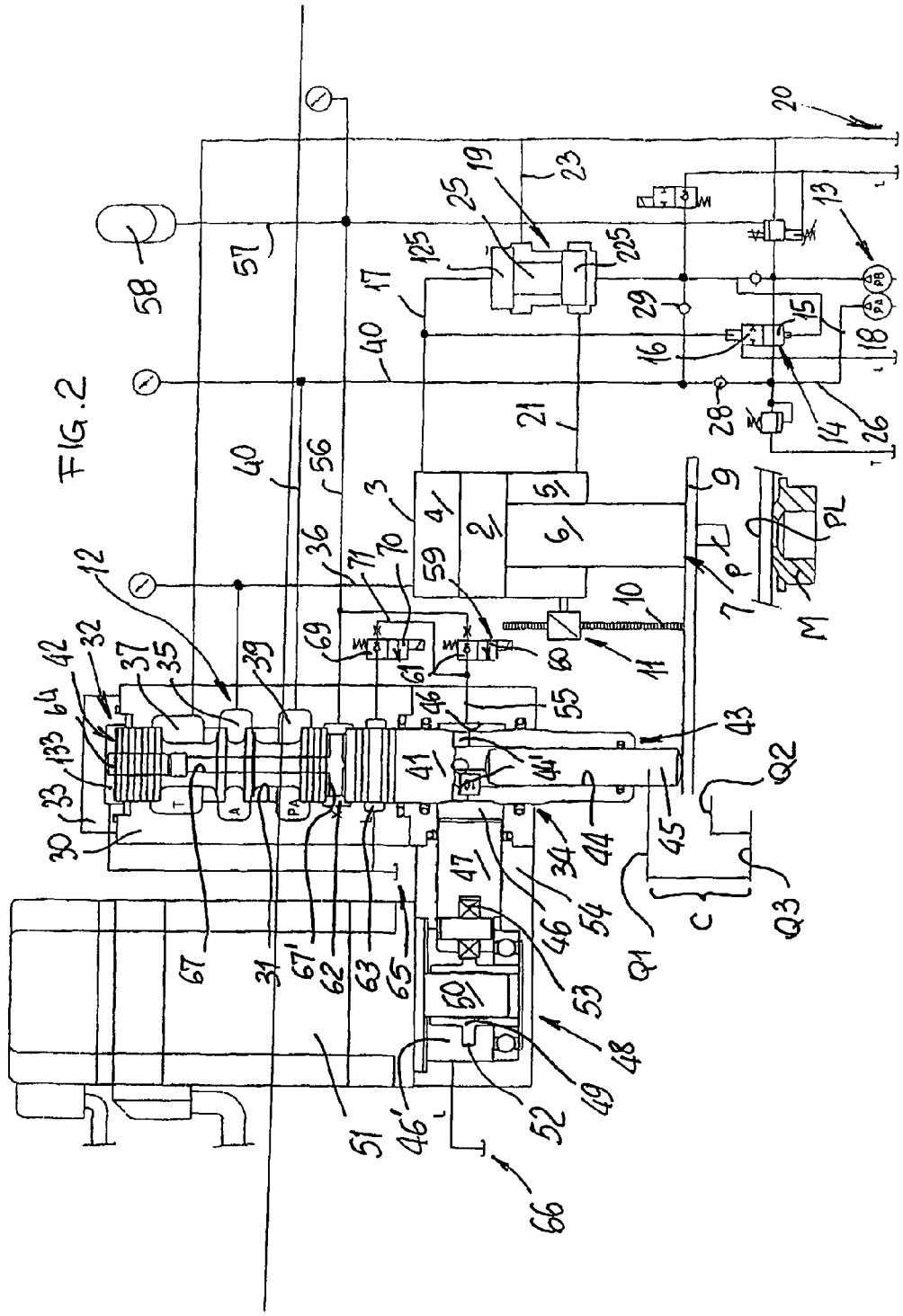
FIG. 2 is a schematic view of the hydraulic circuit of FIG. 1 in a second configuration of the cylinder approaching to a piece to be punched.
Figure 3:
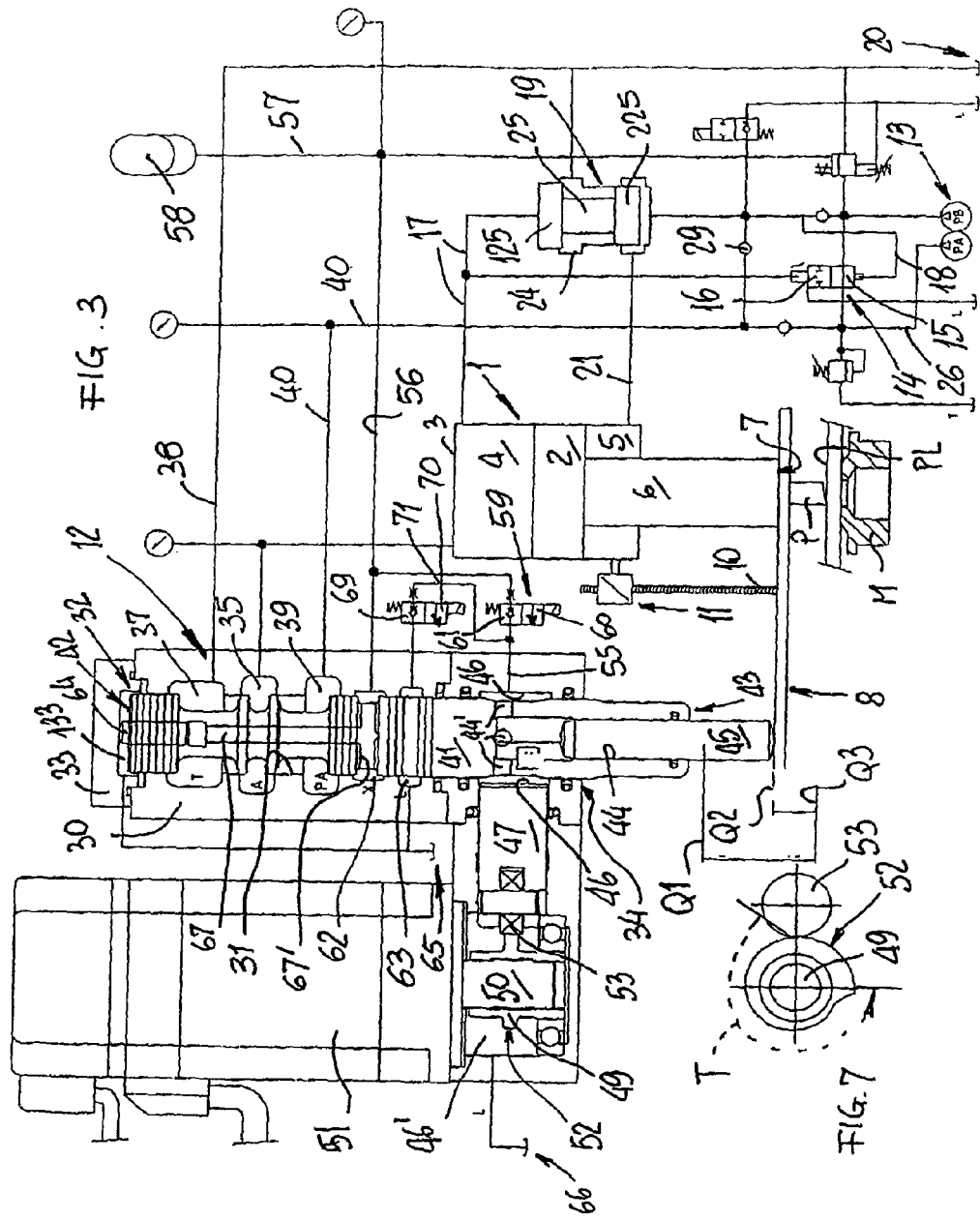
FIG. 3 is a schematic view of the hydraulic circuit of FIG. 1 in a third configuration wherein the cylinder is positioned in a starting position of a punching stroke.
Figure 4:
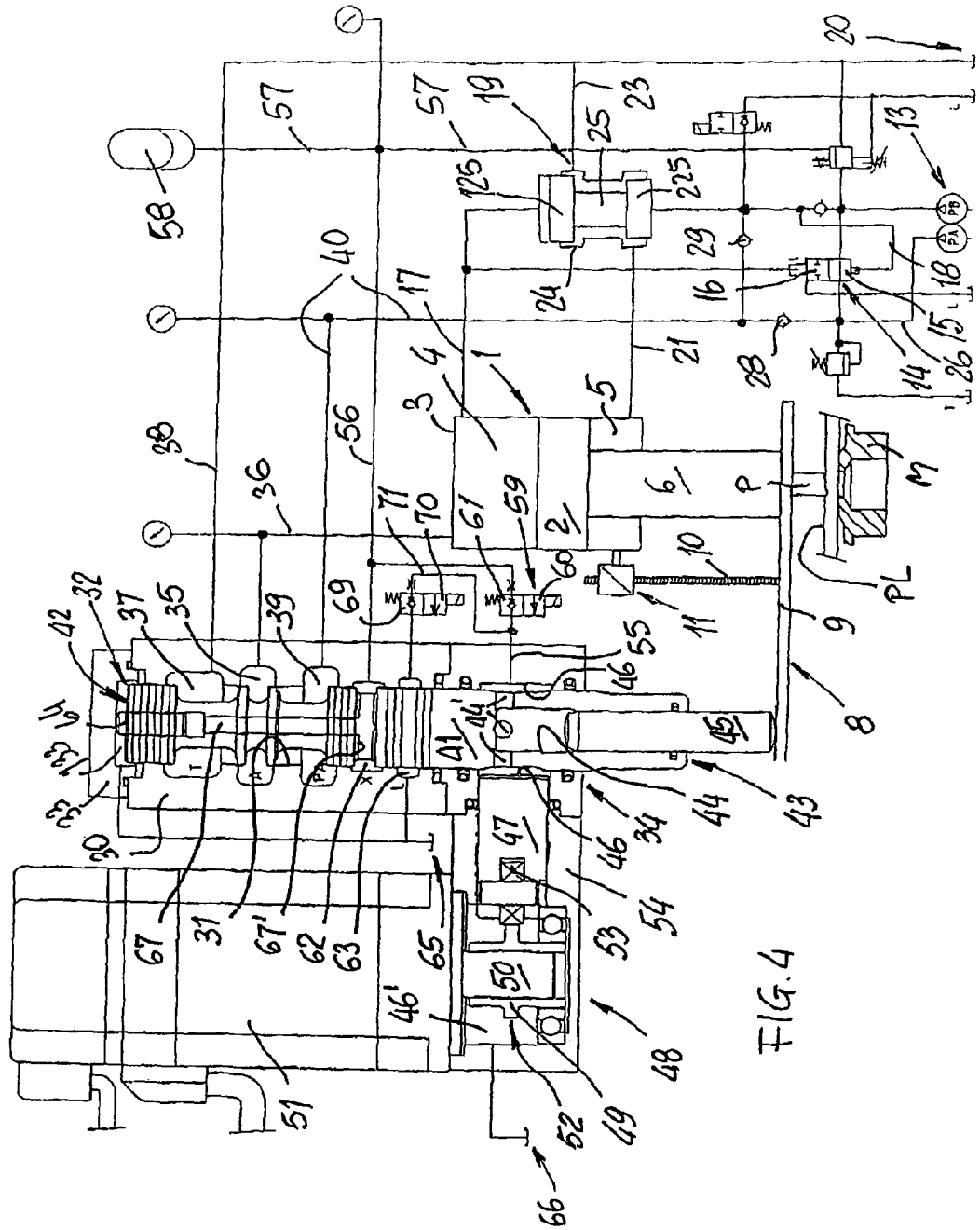
FIG. 4 is a schematic view of the circuit of FIG. 1 in a fourth configuration wherein the cylinder chamber is connected with a drain.
Figure 5:
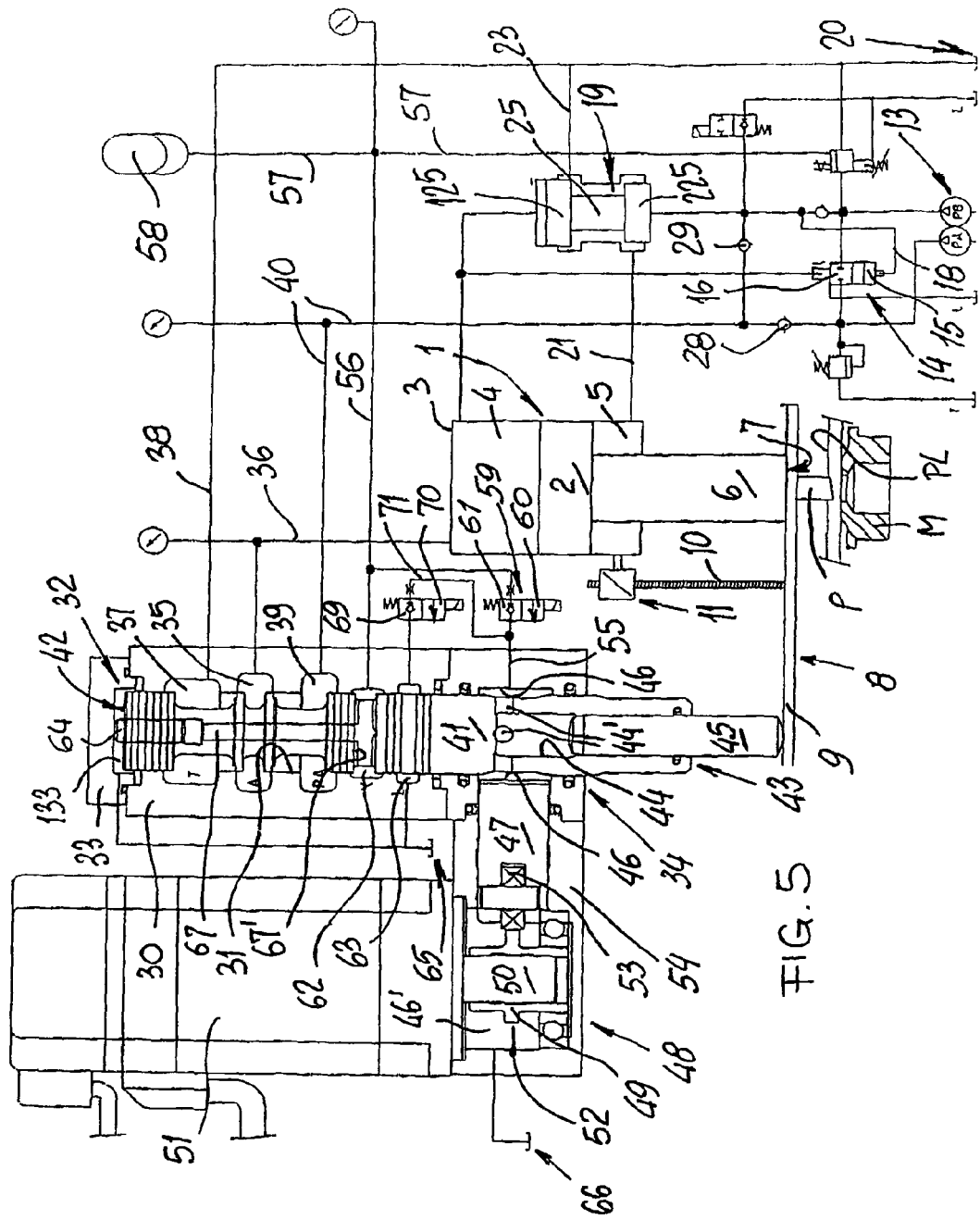
FIG. 5 is a schematic view of a fifth configuration of the hydraulic circuit of FIG. 1 wherein the cylinder is about to begin a punching stroke with the maximum force available.

Between the supply means 13 and the semi-chamber 5 is mounted a second valve 19 which, when oil pressure reaches a predetermined P1 value, is adapted for changing over its normal position shown in FIGS. 1 to 3, to that shown in FIGS. 4 and 5, thus connecting the semi-chamber with a drain 20.

This second valve 19 is connected to the semi-chamber 5 with a branch 21, to the pump "PB" with a branch 22 and to the drain 20 with a branch 23.

The second valve 19 comprises a second liner 24 where a second piston 25 is mounted sliding and this second liner 24 has connection ports with the branches 21, 22 and 23. It can be noted that the second piston 25 has an end 125 which has a bigger cross section than an opposite end 225.

Both the pumps "PA" and "PB" have supply branches indicated with 26 and 27 respectively which are controlled with non-return valves 28 and 29.

The distributor apparatus 12 comprises a body 30, inside which there is obtained a first sliding seat 31 which has an end 32 closed with a closing element 33 and the opposite end 34 open.

The first sliding seat 31 has a series of ports, precisely a first connection port 35 for connecting with the semi-chamber 4 by means of a branch 36, a second port 37 for connecting with the drain 20 by means of a branch 38 and a third port 39 for connecting with the pump "PA" by means of a branch 40.

Inside the first sliding seat 31 is mounted sliding a slider which is adapted for controlling, when sliding, the ports obtained in the body 30, technically named spool 41.

This spool 41 has an end 42 pointing towards the closing element 33 and an opposite end 43 pointing towards the bar 9.

Inside the spool 41 is obtained an axial duct 67 which has its ends communicating respectively with a chamber 133 defined between the closing element 33 and the body 30 and with a further port 62 obtained in the body 30 and whose function will be described further on.

The chamber 133 has a connection port with a drain 65.

The opposite end 43 of the spool 41 has a second seat 44 in which is mounted sliding and sealed a copying-member 45 which extends to the outside of the second seat 44 and which is intended to be placed in contact with the bar 9.

The second seat 44 has a port 44' that connects it with a chamber 46 defined close to the opposite end 43.

Inside this chamber 46 is mounted sliding and sealed a pushing piston 47 which can be driven with reciprocating motion by driving means 48.

The latter comprise a cam element 49, which is mounted on a motorized shaft 50 that exits from a motor unit 51, all placed inside a third chamber 46', which is the extension of the chamber 46 pointing in the opposite direction with respect to the body 30; the third chamber 46' is equipped with a connection line to a drain 66.

The cam element 49 defines an outer profile 52 which is placed in contact with a bearing 53 that is mounted, free to rotate, onto the pushing piston 47, more precisely at one end of this, opposite to the chamber 46.

With particular reference to FIG. 6, it can be noted that the outer profile 52 acting against the bearing 53 and, therefore against the pushing piston 47, determines the stroke that the piston 2 must make using the maximum force to allow the punch "P" to punch a piece placed above the working surface "PL" of a punching machine by its dies "M".

As it can be seen in FIGS. 1-5, the piston 47 is arranged crosswise perpendicular to the copying-member 45 and the chamber 46 is obtained in a second body 54 fastened transversally to the body 30 by its opposite end 34.

The second body 54 also acts as a rest member and a support member for the motor unit 51.

The chamber 46 is connected to a branch 55, which is an offtake of a further branch 56 that, in turn, comes from a branch 57 that connects an accumulator 58, which contains pressurized oil, to the second valve 19.

The accumulator 58 is supplied by both pumps "PA" and "PB" when the valve 14 is in the connection configuration 15.

The branch 55 is controlled with a valve 59 which has two operating positions, i.e. a first position 60 for the passage of oil towards the chamber 46 and a second position 61 for closing the passage.

This valve 59 is operated from outside by an operator by means of a control placed on a control panel of a punching machine, so as to move the copying-member 45 in a controlled way, so that it is positioned in predetermined configurations, as will be described further on.

The branch 55 is also controlled by a further valve 68 which has two operating positions: a first position 69 in which it is closed and a second position 70 in which it is open.

The further valve 68 is operated by an operator by means of an external control on the punching machine's control panel and opens or closes the connection between the branch 55 and the drain 65, through a further port 63 obtained in the body 30 adjacent to the port 62.

FIGS. 1-5 also show the settable levels in the detecting unit 11, at which the piston 2 can be positioned to carry out the different movements of a punching machine: in detail, "Q1" shows a first level of the piston 2 at which it is possible to replace the punches "P", "Q2" shows a second level close to the surface to be punched and at which a punching starts, "Q3" shows an ending level of a punching stroke; "C" shows the length of the whole stroke that the piston 2 can carry out between an upper dead-centre position and a lower dead-centre position.

The operation of the apparatus for punching machines is shown further on with reference to the steps shown in FIGS. 1 to 5.

With reference to FIG. 1 it can be noted that the piston 2 of the punching cylinder 1 is in a completely raised position with respect to the working surface "PL" of a punching machine, which is not illustrated in its whole.

This position, the so called tool-change configuration, is obtained by the operator when he/she operates the control that changes over the valve 68 in the connecting position 70, i.e. connecting the chamber 46 and the second seat 44 with the drain 65. The spool 41 moves slightly along the direction of the bar 9 and opens the connection between the first port 35 and the second port 37.

The copying-member 45 moves against the bottom of the second seat 44 and the bar 9 allows for the cylinder 2 to move towards a higher dead-centre set in the detecting unit 11, i.e. towards the level "Q1".

At the same time, the upper semi-chamber 4 is connected with the drain 20 through the branch 36, the first port 35, the second port 37 and the branch 38.

In this configuration, it can be noted that the cam element 49 is steady in a resting position and is not driven in rotation by the motor unit 51.

Therefore, the pushing piston 47 too is not driven by the cam element 49 and does not carry out any thrust on the oil contained in the chamber 46.

When the punch "P" has been replaced, the operator changes over the configurations of the valves 59 and 68 by means of a control placed on a control panel of a punching machine. In detail, the valve 59 is positioned in the connecting configuration 60 with the chamber 46 while the valve 68 is positioned in the closing configuration 69.

In this configuration of the valves 59 and 68, oil is sent to the chamber 46, both from the pump "PA" and from the pump "PB" jointly, and again from the accumulator 58 through the branches 55, 56, and 57.

Through the connection ports 44', oil also floods the second seat 44, thus generating a pressure on the cross section of the copying-member 45.

It can be noted that the spool 41 is kept continuously pushed towards the reference bar 9 due to the reaction of the oil pressure that acts on the cross section of the elastic gudgeon pin 64, through the axial duct 67 and the connection ports 67' with the further port 62, which, as already described, receives pressurized oil from the supply means 13 through the branches 56 and 57.

When the pressurized oil floods the second seat 44, the spool 41 reacts by moving towards the closing element 33, opening the connection between the third port 39 and the first port 35.

From this first port 35, the pressurized oil reaches the upper semi-chamber 4 through the branch 36.

In this way, as it can be noted in FIGS. 2 and 3, the pressure inside the upper semi-chamber 4 increases progressively and, acting on the cross section of the piston 2, causes the lowering of the punching cylinder 1 to a level "Q2" pre-set in the detecting unit 11 and substantially placed a few millimeters from a surface of a piece to be punched.

At the same time, the copying-member 45 is pushed towards the outside of the second seat 44, keeping the contact with the reference bar 9.

When the level "Q2" is reached, the valve 59 is once more changed over in the configuration 61 and oil stops supplying the chamber 46.

During the movement of the punching cylinder 1 towards the surface of a piece to be punched, the cam element 49 again stays still in the resting position.

When the operator decides to start the punching action, he/she activates the motor unit 51, which causes the cam element 49 to turn, as shown in FIG. 3, making it carry out a rotation section of approximately 300 degrees.

The rotation of the cam element 49 generates a thrust that transmits between its outer profile 52 and the bearing 53 mounted with the pushing piston 47 which goes forward, compressing the oil inside the chamber 46 and causing pressure to increase inside the second seat 44.

By reaction, since the copying-member 45 is against the reference bar 9, the spool 41 rises, opening again the connection between the third port 39 and the first port 35: therefore, the oil that is pumped in conjunction by the two pumps "PA" and "PB" reaches the upper semi-chamber 4 through the branches 27 and 40, the third port 39, the first port 35 and the branch 36, increasing pressure in this and causing the movement of the piston 2 of the punching cylinder I towards the working surface "PL" of the punching machine and the penetration of the punch "P" in the piece to be punched.

This punching takes place at a pre-established punching pressure, which is theoretically sufficient to allow the punch "P" to pass through the piece to be punched.

If however it happens that the piece resistance to the penetration of the punch "P" is bigger than that preset, a rapid increase in pressure occurs inside the upper semi-chamber 4.

This rapid increase in pressure is transmitted through the branches 17 both to the first valve 14 and to the second valve 19.

With reference to FIG. 4, when the first pressure value P1 (previously indicated) is reached, the second valve 19 changes over its normal position shown in FIGS. 1, 2 and 3, in which it keeps the connection between the branch 22 and the branch 21 normally open and provides a configuration, in which the branch 21 is connected with the branch 23 and, therefore, with the drain 20 with which, as a consequence, the lower semi-chamber 5 is connected.

Therefore, inside the latter, pressure rapidly drops and this causes an increase in the speed of descent of the piston 2 in the direction of the piece to be punched. Subsequently, when pressure inside the upper semi-chamber 4 increases to a pre-set value P2 higher than P1, the first value 14 too changes over its configuration, going from configuration 15 to configuration 16: this, practically, interrupts the connection between the pump "PA" and the pump "PB" and allows only the pump "PA", which, as stated, supplies oil at high pressure, to supply the upper semi-chamber 4 through the branches 26 and 40, the third port 39, the first port 35 and the branch 36.

In other words, the pump "PA" supplies the upper semi-chamber 4 with oil at a clearly higher pressure than that of a normal punching, allowing the piston 2, and the punch "P", to overcome the greater mechanical resistance of a piece to be punched, causing the penetration in the latter of the punch "P".

At the same time, it can be noted that, by activating an alternate rotation of the cam element 49 so that the outer profile 52 keeps in contact with the bearing 53, alternately pushing the pushing piston 47, a rapid and alternate movement of the piston 2 is obtained and, therefore, of the punch "P" which can carry out works requiring rapid and successive punching, such as, e.g., "nibbling" or "writing".

To carry out a further replacement of a punch "p", the operator changes over the valve 68 so that this moves into configuration 70, thus connecting the chamber 46 with the drain 65, through the further port 63 and the branch 71.

At the same time, the operator makes the motor unit 51 turn so that the cam element 49 returns to the resting position shown in FIGS. 1 and 2.

Oil pressure drops inside the second seat 44 and the chamber 46, causing the progressive return of the copying-member 45 into the second seat 44.

Also the reference bar 9 begins to move in the opposite direction with respect to the working surface "PL" of the punching machine.

Oil pressure inside the upper semi-chamber 4, through the branch 36 reaches the first port 35 making the spool 41 move in the direction of the working surface "PL".

This sliding causes the opening of the connection between the first port 35 and the second port 37: this also places the upper semi-chamber 4 and the drain 20 in connection with each other through the branch 38.

As a consequence, the piston 2 of the punching cylinder 1 raises to the level of tool-change "Q1" stored in the detecting unit 11.

Also the second valve 19 returns once more to the configuration of normal connection between the branch 22 and the branch 21.

However, by regulating the opening of the valve 68 it is possible to raise the piston 2 just to a level "Q2" of the beginning of the punching cycle.

It is also to be noted that the change-over of the second valve 19 to a configuration that connects the lower semi-chamber 5 with the drain 20, affects both the speed of the piston 2 and the penetration force that the latter can apply to the punch "P", making them both increase noticeably.

It is to be noted that different levels "Q1", "Q2", "Q3" may be selected and stored into the detecting unit 11.

What is claimed is:

1. A fluid distributor apparatus comprising:
a body having distribution ports;

a spool adapted for controlling said distribution ports and mounted sliding in a first sliding seat obtained in said body, said first sliding seat communicating with said distribution ports;

a copying-member mounted sliding and sealed in a second seat obtained in said spool;

supply means for a controlled supply of said fluid to said second seat such to provide a controlled sliding of said copying-member, said supply means comprising:

chamber means containing said fluid and communicating with said second seat; and pushing means of said fluid mounted sliding and sealed in said chamber means, wherein said pushing means are driven with reciprocating driving means, wherein said driving means comprise cam means adapted to be engaged with said pushing means, and rotary driving means of said cam means, wherein said cam means define a pushing profile, adapted for contact with said pushing means, wherein said pushing means comprise a pushing piston, and wherein a rolling element is placed between said pushing piston and said pushing profile, said rolling element being free to rotate around a rotation pin supported at one end of said pushing piston facing said cam means.

2. The apparatus according to claim 1, wherein said chamber means are obtained in a second body.

3. The apparatus according to claim 1, wherein said first sliding seat is connected with pumping means adapted for pumping said fluid toward a user device.

4. The apparatus according to claim 3, wherein said distribution ports comprise a first port connected to said user device, a second port connected to draining means, and a third port connected with said pumping means.

5. The apparatus according to claim 3, wherein, between said second seat and said pumping means, a first control valve is provided to control a supply of said fluid to said chamber.

6. The apparatus according to claim 3, wherein said user device comprises a punching cylinder of a punching machine.

7. The apparatus according to claim 6, wherein said punching cylinder comprises a piston sliding within a liner and a stem having an outer end opposite said piston, said outer end extending from said piston to the outside of said liner, said outer end being equipped with one or more of detecting or storing means for detecting movements of said piston in a moving direction or for storing pre-selected stroke values of said piston.

8. The apparatus according to claim 7, wherein said detecting means comprise:

a reference body coupled to said outer end;
graduated means coupled to said reference body;
reading means of said graduated means; and
storing means.

9. The apparatus according to claim 8, wherein said reference body comprises a bar supported crosswise to said stem and substantially perpendicular to said moving direction, said bar being arranged for receiving by contact said copying-member.

10. The apparatus according to claim 1, wherein said fluid comprises pressurized oil.

11. The apparatus according to claim 1, wherein said second seat is obtained at one end of said spool facing a resting surface for pieces to be worked on.

12. The apparatus according to claim 11, wherein said second seat comprises a first open end facing resting surface and a second end opposite to said resting surface.

13. The apparatus according to claim 12, wherein one or more connection ports are provided at said second end of said second seat, the one or more connection ports being in fluid communication with said chamber means.

14. A fluid distributor apparatus comprising:

a body having distribution ports;

a spool adapted for controlling said distribution ports and mounted sliding in a first sliding seat obtained in said body, said first sliding seat communicating with said distribution ports;

a copying-member mounted sliding and sealed in a second seat obtained in said spool;

supply means for a controlled supply of said fluid to said second seat such to provide a controlled sliding of said copying-member, said supply means comprising:

chamber means containing said fluid and communicating with said second seat; and pushing means of said fluid mounted sliding and sealed in said chamber means, wherein said first sliding seat is connected with pumping means adapted for pumping said fluid toward a user device, wherein said user device comprises a punching cylinder of a punching machine, wherein said punching cylinder comprises a piston sliding within a liner and a stem having an outer end opposite said piston, said outer end extending from said piston to the outside of said liner, said outer end being equipped with one or more of detecting or storing means for detecting movements of said piston in a moving direction or for storing pre-selected stroke values of said piston, and wherein a second connection valve is placed between said pumping means and said punching cylinder, said second connection valve connecting or disconnecting a first semi-chamber of said liner containing said stem with drain/recovery means of said fluid.

15. The apparatus according to claim 14, wherein a second semi-chamber is defined between said piston and said liner, the second semi-chamber being opposite said first semi-chamber.

* * * * *